United States Patent [19]

Scala et al.

[11] 4,003,812

[45] Jan. 18, 1977

[54] COLLOIDAL POLYSULFONE ELECTRODEPOSITION COMPOSITIONS

[75] Inventors: Luciano C. Scala, Murrysville; David C. Phillips, Pittsburgh, both of Pa.

[73] Assignee: Westinghouse Electric Corporation, Pittsburgh, Pa.

[22] Filed: Apr. 15, 1975

[21] Appl. No.: 568,227

[52] U.S. Cl. .............................. 204/181; 260/30.2; 260/32.6 R; 260/32.8 R; 260/30.8 DS

[51] Int. Cl.² ................... C08K 3/18; C08K 3/28; C25D 13/06; C25D 13/10

[58] Field of Search ........ 260/30.2, 32.6 R, 32.8 R, 260/79.3 A, 30.8 DS; 204/181

[56] References Cited

UNITED STATES PATENTS

| 3,450,655 | 6/1969 | Spiller | 204/181 |
| 3,463,714 | 8/1969 | Suomi et al. | 204/181 |
| 3,773,720 | 11/1973 | Vogel | 260/30.2 |
| 3,875,103 | 4/1975 | Leslie | 260/32.8 R |

*Primary Examiner*—Allan Lieberman
*Attorney, Agent, or Firm*—D.P. Cillo

[57] ABSTRACT

A conducting, non-aqueous, colloidal, polysulfone electrodeposition composition is made by mixing: (1) 1 part polysulfone polymer and 20–37 parts non-aqueous, organic, aprotic solvent for the polysulfone polymer with (2) 0.8–1.2 parts of a nitrogen containing base, to form a polysulfone polymer solution, which is added to (3) 25–150 parts of a non-aqueous, non-solvent for the polysulfone polymer, which is miscible with the aprotic solvent.

9 Claims, No Drawings

COLLOIDAL POLYSULFONE ELECTRODEPOSITION COMPOSITIONS

BACKGROUND OF THE INVENTION

When a direct current potential is applied across an emulsion or solution containing charged molecules, the molecules migrate toward the electrode bearing the opposite charge. This phenomenon is generally called electrophoresis, and is utilized to apply coatings onto metallic surfaces for purposes of electrical insulation, paint priming, weather protection, and the like.

Most of the polymer electrophoretic deposition techniques followed in industry involve aqueous systems. However, aqueous depositions are in general markedly affected by the evolution of gases at the electrodes. This gas evolution, deriving from water electrolysis, can result in heavily pitted polymer coatings, which makes them particularly unsuitable for electrical insulation. Moreover, water emulsion systems are generally plagued by difficult-to-control surface tension and pH conditions, and viscosity difficulties.

Polyimide resins have recently come into use as high temperature electrical insulating films. Polyimide films are generally produced by film casting or dip coating of a substrate in a non-aqueous solvent solution followed by a heat cure. A major problem with the solution dip coating or casting methods is that only relatively thin films (0.001 inch for foil coatings) can be produced in a single coat. Difficulty is also encountered in uniformly coating corners, sharp edges and irregular shaped objects by the solution dip coating or casting methods because of surface tension effects.

As a partial solution, electrophoretic deposition techniques have been developed for polyamic acids in water emulsion systems, as described in U.S. Pat. No. 3,537,970. However, such an aqueous polymer electrodeposition system still suffers the aforedescribed disadvantages of film pitting. In addition, while the films electrodeposited from polyamic acids have excellent thermal stability at high temperatures, and would be useful, for example, as electrical insulation in stator core slots operating in 175° C to 250° C environments; the polyamic acid compositions have relatively low electrical ability (or low "throwing power") to deposit in the interior of hollow metal shapes. Thus, it is difficult to completely electrocoat the inside of complex shapes such as stator core slots using polyamic acid compositions.

Although most of the polymer electrophoretic deposition techniques applied in industry involve aqueous processes, a few organic systems, such as those shown in U.S. Pat. Nos. 3,450,655 and 3,463,714, have also been used. These systems would provide more pinhole free coatings. These systems have involved vinyl resins, epoxy resins, and carboxyl-containing polymers and copolymers such as polyacrylic acid, vinyl acetate/maleic acid copolymers, ethylene/itaconic acid copolymers and ethylene/maleic acid copolymers. However, these materials generally do not measure up to 175° C to 250° C requirements, and most of these resin systems do not possess the unique "throwing power" characteristics required to electrocoat the inside of complex shapes.

As regards the resin system, it has been found that a great number of variables exist in non-aqueous electrodeposition compositions, with respect to the ratio between resin polymer and solvent, and between solvents within the solvent system; and that each resin polymer used presents its own characteristic problems in its dilution or suspension and deposition. It has also been found that emulsions of the resin polymer give electrocoated films which are superior to those obtained from solutions of the resin polymer, but that emulsions require a very critical balance of component ingredients.

As regards "throwing power," according to Gauss' Law, the electrical charge on a hollow conductor is located on the surface, and the electric field within the conductor is non-existent. The electrocoating of pockets, corners and slots of a workpiece is limited by this phenomenon, commonly called the "Faraday Cage Effect." The ability of an electrodeposit to penetrate into the interior of hollow metal shapes depends, among other things, upon the coating composition component ratios described above, upon the particular electrical properties of the coating material, and upon the applied voltage.

What is needed then is an inexpensive, improved, non-aqueous electrodeposition method and composition. This composition should be a colloidal emulsion of a material having improved "throwing power," which will provide a coating with temperature capabilities in the 175° C to 250° C range; the composition being capable of electrical deposition in the interior of complex metal shapes, in thick uniform builds, without pinholes, upon a single electroapplication.

SUMMARY OF THE INVENTION

In accordance with this invention, it has been found that the foregoing difficulties may be overcome, so that interior and exterior portions of regular and irregular-shaped electrical conductors can be uniformly and heavily coated, with good edge coverage and without pitting, in a single coating operation. This can be accomplished by the electrodeposition of a polysulfone polymer from a nonaqueous composition, followed by a heat treatment to evaporate the solvents and to form a polysulfone resinous film. This composition includes polymers containing sulfone linkages in their polymer chain, a nitrogen containing base and a dual solvent system.

More specifically, high temperature polysulfones particularly useful in the compositions of this invention contain aromatic phenylene and/or diphenylene groups joined by either sulfone, ether or isopropylidene linkages, where mixtures of the groups and linkages can be present in the polymer chain. The solvent systems consists of a liquid, organic, non-aqueous, aprotic solvent for the polysulfone polymer, and a low molecular weight ketone which is a nonsolvent for the polysulfone. The composition components are subjected to critical addition steps within critical weight percent ratios to form a conducting, non-aqueous colloidal dispersion.

DESCRIPTION OF THE PREFERRED EMBODIMENTS

The films, after electrodeposition and subsequent heating in accordance with this invention, comprise polymers characterized as containing a substantial number of sulfone linkages in the polymer chain.

Polysulfones are well known in the art. They were introduced to the market in 1965 as a novel type of linear polymer consisting of phenylene units connected by isopropylidene, ether and sulfone linkages. This material, having high deflection temperatures under load and high tensile strength, was found suitable for use as housings for engineering, electrical and domestic appliances where heat and/or creep resistance were important requirements. In U.S. Pat. No. 3,676,814 they are taught as a high temperature adhesive enamel for magnet wire.

In terms of its chemical makeup, the most distinctive feature of the polysulfone polymer which can be used in the compositions of this invention, is the sulfone linkage

. This linkage, which characterized this type polymer, along with phenylene groups

diphenylene groups

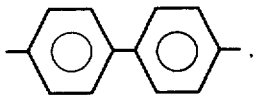

and ether (oxygen) linkages —O—, all of which may be present in various combinations in the polymer, impart excellent thermal and oxidation resistance to the chain. Flexibility in the backbone of the polymer can be contributed by a certain amount of isopropylidene linkages

Such polymers can be prepared via well known nucleophilic aromatic substitution reactions. These polymers do not contain carboxyl groups generally found in the prior art electrodeposition polymers.

A particularly useful polysulfone copolymer composed of phenylene and diphenylene groups joined by sulfone and ether (oxygen) linkages in the polymer chain, having extremely good thermal stability, can be made, without attached aliphatic isopropylidene linkages, by a Friedel-Crafts type reaction represented by the following equation, substantially as shown below, where the monomer number $n = 20 - 30$:

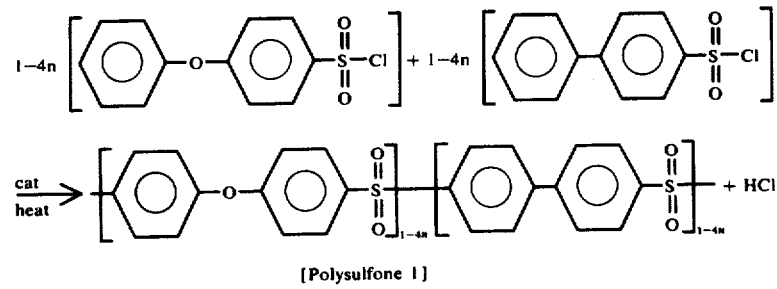

[Polysulfone 1]

This polyaryloxysulfone copolymer will preferably be composed of about 40 mole % of oxydiphenylene sulfone groups (2n) and about 60 mole % of diphenylene sulfone groups (3n). It has a molecular weight of between about 40,000 to 60,000. The rigid, aromatic backbone structure of the polyarylsulfone is reflected in the excellent abrasion resistance and hardness of the coating. Impact resistance is also outstanding. Since the base resin does not contain any hydrolizable linkages, it is not affected by steam or acids and bases in general. These type polyarylsulfones are true thermoplastics and have melting points above 250° C. They also provide excellent electrical insulating properties and exhibit good "throwing power" and edge coverage.

In one method of making these sulfone containing polymers a reaction vessel is charged with stoichiometric quantities of monosulfonyl chlorides of biphenyl and of diphenyl ether. Nitrobenzene is added to obtain a solids concentration of about 30% – 50%. The reactor contents are heated to about 120° C and about 0.3% – 1.0% of a suitable catalyst based on polymer is added. The reactor temperature is then raised to about 130° C – 145° C over a period of about 1 hour and maintained for about 20 minutes. The polymer is then diluted further with dimethylformamide or N-methylpyrrolidone to about a 20% solids content. The monosulfonyl chlorides of diphenyl ether and biphenyl can be prepared by known procedures from the corresponding sulfonic acids by treatment with thionyl chloride in the presence of dimethylformamide, and purified by recrystallization from petrol ether-chloroform.

Other linear aromatic polysulfone thermoplastic polymers particularly useful in our invention include:

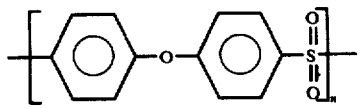

[Polysulfone 2]

where the monomer number $n = 20 - 500$; and

[Polysulfone 3]

where the monomer number $n = 20 - 500$. These polysulfones contain no aliphatic carbon-carbon bonds and have melting points of about 250° C.

For a detailed description and synthesis of all the above polymers, reference may be made to French Pat.

No. 1,453,031 and British Pat. Nos. 1,060,546; 1,016,245; and 1,181,390.

Other polysulfones that are useful in our invention would include [4,4'-diphenoxy)-4,4'''-diphenylsulfonyl]-4,4'-diphenoxydiphenyl sulfone, which contains phenylene groups and sulfone and ether linkages in combination in the polymer chain:

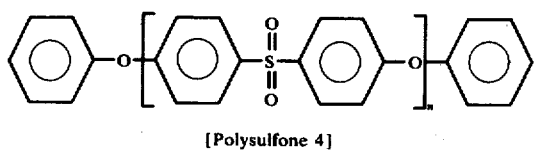

[Polysulfone 4]

where the monomer number $n$ is about 2–4. This linear aromatic polysulfone is a thermoplastic, has a melting point of about 227° C and can be prepared by reacting the potassium salt of 4-hydroxy-4'-phenoxydiphenyl sulfone with 4,4'-difluorodiphenyl sulfone for about 4 hours at between 135° C and 155° C. Further details of preparation can be found in an article by W. F. Hale et al in the Journal of Polymer Science, Part A-1, Vol. 5, pp. 2403–2405 (1967).

Other polysulfone thermoplastic resins useful in our invention are those containing isopropylidene linkages as well as ether linkages and sulfone linkages in combination with phenylene groups in their polymer chain. Such polysulfones have the repeating structure substantially as shown below:

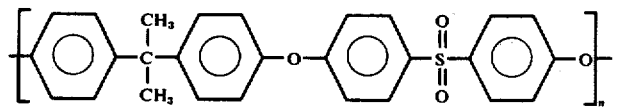

[Polysulfone 5]

where the monomer number $n = 50 - 80$. This polysulfone resin can be made by the condensation of bisphenol with activated aromatic dihalides. Complete details of preparation can be found in an article by R. H. Johnson et al in the *Journal of Polymer Science*, Part A-1, Vol. 5, pp. 2375–2395 (1967). This polysulfone resin is a thermoplastic, and has a melting point of about 187° C. Thermal stability is provided by the high strength bonds of the combined phenylene-sulfone-phenylene group. The presence of aliphatic groups other than isopropylidene will tend to seriously degrade the thermal properties of the cured resin. All of the above-described sulfone containing polymers can be used alone or in mixtures.

Suitable solvents for the polysulfones are liquid, organic, non-aqueous, non-gassing (non-electrolizable), aprotic solvents, i.e., solvents which will neither lose a proton to the solute nor gain a proton from the solute, for example, the normally liquid organic solvents of the N,N-dialkylcarboxylamide class, preferably the lower molecular weight members of this class, such as dimethyl acetamide, dimethyl formamide, and N-methyl-2-pyrrolidone. Other useful aprotic solvents which dissolve polysulfone include dimethyl sulfoxide and pyridine. The solvents can be used individually or in combinations of two or more.

The basic, organic non-aqueous nitrogen containing compounds which are added to the polysulfone polymer include secondary or tertiary aliphatic and aromatic amines such as, for example, trimethylamine, triethylamine, N,N-dimethylbenzylamine, tri-n-propylamine, tri-n-butylamine, N-ethyl-piperidine, N-allylpiperidine, N-ethylmorpholine, N,N-diethyl-m-toluidine, N,N-diethyl-p-toluidine, N-allylmorpholine, N,N-diethylaniline, pyridine, imidazole, 1-methylimidazole, 4-methylimidazole, 5-methylimidazole, 1-propylimidazole, 1,2-dimethylimidazole, 1-ethyl-2-methylimidazole, 1-phenylimidazole and mixtures thereof.

The polysulfone polymer is first dissolved in the solvents described above, mixed with the nitrogen containing base described above, and then added very slowly to a non-electrolizable, liquid, non-solvent for the polysulfone, such as a ketone, with rapid stirring. The nitrogen containing base can be added after all the solvent is added, or it can be added to concentrated solutions of polysulfone which are then further diluted. The amount of non-solvent for the polysulfone must be effective to form a stable colloidal emulsion in the aprotic solvent-non-solvent system. We have found that our emulsion of dispersed microscopic particles in a solvent-non-solvent system, electrocoats far better than a solution system; and that it is critical to add the solution of polysulfone polymer and nitrogen containing base to the non-solvent for the polysulfone, such as a ketone, and not vice versa, in order to get a useful, conducting, electrocoatable, stable emulsion that will remain in suspension.

Suitable liquid, organic, non-aqueous, non-gassing (non-electrolizable) ketones, which are miscible with the aprotic solvent for the polysulfone and which will cause a colloidal suspension of polysulfone, would include low molecular weight, liquid, aliphatic (straight and branched chain) and aromatic ketones, containing between about 3 to 18 total carbon atoms in the compounds, such as, for example, acetone, methyl isobutyl ketone, methyl ethyl ketone, methyl-n-propyl ketone, diethyl ketone, mesityl oxide, cyclohexanone, methyl n-butyl ketone, ethyl n-butyl ketone, methyl n-amyl ketone, acetophenone, methyl n-hexyl ketone, isophorone and di-isobutyl ketone and mixtures thereof. These materials are generally considered solvents, i.e. they will dissolve many components although in this case they are not a solvent for the polysulfone polymer. Useful non-solvents for the polysulfone are those non-electrolizable liquids i.e. liquids that won't break up into smaller products or gases on passage of electricity through it, which when a polysulfone solution, containing 0.8–1.2 parts of an organic nitrogen containing base per 1 part of polysulfone, is titrated onto it, will cause formation of suspended, fine particles of polysulfone polymer within the liquid matrix.

In all cases, the materials used in the dual system (i.e. N,N-dialkylcarboxylamide types plus ketone types) must not gas to any great extent at the electrodes due to electrolysis when a voltage is applied to the system. It will be understood however, that the terms non-electrolizable and non-aqueous are not meant to be absolute, for example, impurity amounts of water which may be present in the composition components or absorbed from the atmosphere may be present.

Major substitution for the above solvents or bases by any of a wide variety of compounds which are electrolizable, such as water, methanol, ethanol, ammonium hydroxide inorganic type base, and aqueous sodium or potassium hydroxide solution, will cause pitting in the final electrodeposited film. Small effective amounts of filler particles as such or as finely divided pigments, or small quantities of wetting agents can be added to the composition for a variety of end uses, such as providing a colored coating or insuring good adhesion to the substrate.

In preparation of the electrodeposition composition, the component materials must be added within critical wt.% ratios. The process for preparing the colloidal dispersion consists of: (1) admixing the polysulfone polymer, a non-aqueous organic aprotic solvent which is non-electrolizable, and an organic nitrogen containing base, (2) adding the admixture formed in (1) to a non-aqueous, organic, non-electrolizable non-solvent for the polysulfone, preferably a ketone, to provide the colloidal dispersion of the polysulfone within the electrodeposition composition.

The electrodeposition composition is formed by addition of about 1 part by weight polysulfone, about 20-37 parts aprotic solvent for said polysulfone, about 0.8-1.2 parts nitrogen containing base, and about 25-150 parts ketone non-solvent for the polysulfone in solution. The addition ranges in this particular system are critical. Under 20 parts aprotic solvent for the polysulfone polymer will cause viscosity problems and precipitation and over 37 parts aprotic solvent for the polysulfone polymer will impede electrocoating because the polysulfone polymer will stay in solution. Under 25 parts ketone will impede electrocoating because the polysulfone polymer will stay in solution. Over about 150 parts ketone will cause gross precipitation of the polymer within the two-solvent medium.

In the process of this invention, polysulfone films have been successfully electrodeposited from non-aqueous colloidal dispersions of polysulfone in mixed organic solvent systems. The resin compositions for the process are formulated at much lower solids content than used in conventional solution dip coating and casting and most electrodeposition methods. The low solids content used is necessary in this electrodeposition technique, and results in extremely low solution viscosity which assures rapid solvent removal from coated substrates and elimination of any runs and sags on the coated article. The solids content for the electrodeposition composition should be between about 0.5-1.5 wt.% based on polysulfone polymer, nitrogen containing base and total solvent including ketone types. The composition will have a pH range of between 7-11.

The electrocoating process is highly complex and not completely understood. There is no apparent salt formation between the polysulfone containing polymer and the amine in the solution of aprotic solvent. It is believed however, that the amine is very effective in negatively charging the colloidal particles formed when the polysulfone-base solution is added to the ketone.

In the electropolymerization apparatus, when current is applied, the negatively charged colloidal particles migrate to the anode, which is the electrically conductive workpiece to be coated, and deposit thereon with excellent "throwing power." In this process, the applied potential difference between the cathode and the workpiece is between about 25 volts to 250 volts, the current applied is approximately between about 0.1 to 1.0 amps for stator coils having diameters of about 2 inches, and dwell time in the apparatus bath is between about 0.25 minute to 10 minutes.

On subsequent heat treatment in a drying tower or oven, between about 150° C to 225° C for about 1 minute to 30 minutes, solvents are removed and a solid, pinhole free polysulfone film, about 0.25 mil to 8 mils thick, is produced.

The following nonlimiting examples are illustrative of various sulfone containing polymers and solvents that can be used in making the colloidal electrodeposition compositions of this invention.

EXAMPLE 1

A sulfone containing electrodeposition composition was formed by: (1) mixing 5.5 grams of polysulfone polymer dissolved in 22 grams of dimethyl acetamide aprotic solvent for the polymer (25 ml. of a polysulfone solution having 20 wt.% solids content, a molecular weight of about 50,000 and a formula represented by Polysulfone 1 above, with $2n$ oxydiphenylene sulfone groups and $3n$ biphenylene sulfone groups, sold commercially by 3M Company under the tradename 380 Polysulfone with 110 grams (100 ml.) of N-methyl-2-pyrrolidone aprotic solvent for the polysulfone polymer; adding 5.2 grams (5 ml.) of 1-methylimidazole dropwise to complete the production of a polysulfone solution. The resulting solution, containing 1.0 parts by weight imidazole nitrogen containing base and 24 parts by weight combined solvent for the polymer to 1 part polysulfone polymer, was vigorously stirred, heated to about 40° C, and held at that temperature for 20 minutes; (2) this solution was added by dropwise titration with vigorous stirring to 314 grams (400 ml.) of acetone, a non-solvent for polysulfone polymer in solution; to provide a non-aqueous, conducting, colloidal composition of suspended fine particles in the liquid. The composition contained 57 parts by weight non-solvent for the polysulfone in solution to 1 part polysulfone polymer. The solids content was about 1.2 wt%.

About 300 ml. of this colloidal electrodeposition composition, have a pH of about 8-9, was added to a 500 ml. Pyrex container with two 2 inches × 1 inch × 0.02 inch aluminum electrodes (anode and cathode) connected to a variable voltage d.c. power supply. The anode to cathode separation through the electrodeposition composition was about 1 inch. A potential difference of 150 volts was applied for one minute. Under the influence of the electric field the polysulfone polymer negatively charged by the imidazole migrates to the anode and produces an adherent coating on the anode without any gassing of the composition. Current densities were about 12 mA/sq. in. of total electrode surface (anode plus cathode).

The coated electrode was removed from the electrodeposition composition and slowly heated from 50° C to 320° C in a convection oven over a period of two hours. The final heating step consisting of one hour heating at 320° C. A very tough, pinhole free, flexible film coating with good edge coverage 0.5 mil thick (0.0005 inch) was produced. An increased electrocoating time of 2 minutes produced a thicker coating of 0.8 mil. For short electrocoating times, less than 30 minutes, there was no necessity to stir the composition and no precipitation or agglomeration of the resin was seen. The composition could be stored up to five days without loss of stability. The resin content of the bath could be completely depleted without showing any adverse effects on the properties of the final coating.

EXAMPLE 2

A polysulfone electrodeposition composition was formed with 3M's 380 Polysulfone Wire Enamel exactly as in EXAMPLE 1, except that 110 grams (100 ml) of dimethylsulfoxide aprotic solvent was substituted for the 100 ml of N-methyl-2-pyrrolidone.

About 300 ml of this colloidal electrodeposition composition, having a solids content of about 1.2 and a pH of about 8–9, was added to the container used in EXAMPLE 1, and polysulfone was coated on the aluminum anode, but using 150 volts at 20 mA/sq. in. for 2 minutes, and 100 volts at 20 mA/sq. in. for 4 minutes. The coated electrodes were removed from the composition and heated to final cure as in EXAMPLE 1, to provide very tough, pinhole free, flexible film coatings with good edge coverage 0.7 and 1.2 mils thick respectively.

EXAMPLE 3

A polysulfone electrodeposition composition was formed by: (1) mixing 5.5 grams of polysulfone polymer dissolved in 22 grams of dimethylactamide aprotic solvent for the polymer (25 ml. of polysulfone wire enamel solution having 20 wt.% solids content sold commercially by 3M Company under the tradename 380 Polysulfone) with 110 grams (100 ml.) of dimethylsulfoxide aprotic solvent for the polymer; adding 5.2 grams (5 ml.) of triethylamine dropwise to produce a polysulfone solution. The resulting solution, containing 1.0 parts by weight organic amine nitrogen containing base and 24 parts by weight combined solvent for the polymer to 1 part acid polymer, was vigorously stirred, heated to about 40° C., and held at that temperature for 20 minutes; (2) this solution was added with vigorous stirring to 315 grams (400 ml.) of acetone, a non-solvent for the polysulfone polymer in solution, to provide a non-aqueous, conducting colloidal composition containing 57 parts by weight non-solvent for the polysulfone polymer in solution to 1 part polysulfone polymer. The solids content was about 1.2 wt.%.

About 300 ml. of this colloidal electrodeposition composition, having a pH of about 8–9, was added to a 500 ml. Pyrex glass container with a 2 inches × 1 inch × 0.02 inch copper cathode and a 6 inches × 6 inches × 0.02 inch flat stainless steel panel anode connected to a variable voltage d.c. power supply. The anode to cathode separation through the electrodeposition composition was about 1 inch. A potential difference of 50 volts was applied for 1 minute. Current densities were about 12 mA/sq. in.

The coated panel was removed from the electrodeposition composition and slowly heated from 50° C to 200° C in a convection oven over a period of two hours. A very tough, pinhole free, flexible film coating with good edge coverage one mil thick (0.001 inch) was produced. The composition could be stored up to five days without loss of stability. The resin content of the bath could be completely depleted without showing any adverse effects on the properties of the final coating.

Similarly, an anode comprised of a degreased 1¾ inches iron stator core having a multitude of deep interior slots was immersed in the composition described above. A potential difference of 200 volts was applied between the conductive body and the cathode counter electrode for a period of five minutes. The coil was removed from the bath and heated from 50° C to 200° C in a convection oven over a period of two hours. This produced a continuous, smooth, pinhole free polysulfone coating on the irregular shaped coil and inside the slots, thus proving the excellent "throwing power" of these compositions. An apparent dielectric strength of about 2200 volts was obtained when the coils were completely immersed in mercury and subjected to a potential (60 Hz power supply) increasing at 500 volts/sec.

We found that when the acetone component of the composition was replaced by water, which will electrolize, the polysulfone coatings that are formed do not adhere very well and are heavily pitted, even when very low potential differences are applied. This is due to water electrolysis (gaseous products) at the anode, making the aqueous composition disadvantageous for electrical applications.

EXAMPLE 4

A polysulfone containing electrodeposition composition was formed as in EXAMPLE 3, except that 5.5 grams of a polysulfone polymer containing isopropylidene linkages was used in place of the 380 Polysulfone. This polysulfone had a formula represented by Polysulfone 5 above, with a monomer number of between 50–65 (sold commercially by Union Carbide Corp. under the tradename P1700 Bakelite Polysulfone Extrusion and Molding Compound).

About 300 ml this colloidal electrodeposition composition, having a solids content of about 1.2 and a pH of about 8–9, was added to the container used in EXAMPLE 3. The same type copper cathode and stainless steel panel were used, with an anode to cathode separation of 1 inch. The panel was coated but using a potential difference of 50 volts for two minutes. Current densities were about 25 mA/sq. in.

The coated panel was removed from the electrodeposition and slowly heated from 50° C to 200° C in a convection oven over a period of 2 hours. A very tough, pinhole free, flexible film coating with good edge coverage 1.4 mils thick (0.0014 inch) was produced. An apparent dielectric strength of about 2000 volts was obtained when the coated panel was completely immersed in mercury and subjected to a potential (60Hz power supply) increasing at 500 volts/sec.

The other polymers containing sulfone groups in their polymer backbone chains described hereinabove would work equally well alone or in combination with the polysulfones used in the Examples. Similarly, other N,N-dialylcarboxylamides could be substituted for dimethyl acetamide, and dimethyl formamide and pyridene could be substituted for or used in combination with the polysulfone solvents used in the Examples. Likewise the wide variety of amines described hereinabove could be used as the nitrogen containing compound and the wide variety of aliphatic and aromatic ketones described hereinabove, as well as other suitable non-solvents for the polysulfone, could be substituted for acetone as the non-solvent for the polysulfone.

We claim:

1. A method of making a conducting, non-aqueous, colloidal polysulfone electrodeposition composition, comprising the steps of:
   a. combining 1 part by weight of a polysulfone comprising aromatic groups selected from the group consisting of phenylene and diphenylene and mixtures thereof joined together by linkages selected from the group consisting of sulfone, ether and isopropylidene and mixtures thereof, said polysulfone characterized as having at least sulfone linkages, 20–37 parts by weight of a non-aqueous, organic, aprotic solvent for the polysulfone and 0.8–1.2 parts by weight of a secondary or tertiary amine, to form a polysulfone solution, followed by
   b. adding this polysulfone solution to 25–150 parts by weight of a non-aqueous, organic, non-electrolizable, liquid, non-solvent for the polysulfone, which is miscible with the aprotic solvent, to provide an electrodeposition composition having a colloidal dispersion within the solvent mixture, said composition having a pH of between about 7–11.

2. The method of claim 1 wherein the non-solvent for the polysulfone is a ketone.

3. The method of claim 2 wherein the amine is selected from the group consisting of trimethyl amine, triethylamine, N,N-dimethylbenzylamine, tri-n-propylamine, tri-n-butylamine, N-ethylpiperidine, N-allylpiperidine, N-ethylmorpholine, N,N-diethyl-m-toluidine, N,N-diethyl-p-toluidine, N-allylmorpholine, N,N-diethylaniline, pyridine, imidazole, 1-methylimidazole, 4-methylimidazole, 5-methylimidazole, 1-propylimidazole, 1,2-dimethylimidazole, 1-ethyl-2-methylimidazole, 1-phenylimidazole and mixtures thereof, and the ketone is selected from the group consisting of acetone, methyl isobutyl ketone, methyl ethyl ketone, methyl n-propyl ketone, diethyl ketone, mesityl oxide, cyclohexanone, methyl-n-butyl ketone, ethyl-n-butyl ketone, methyl-n-amyl ketone, acetophenone, methyl-n-hexyl ketone, isphorone, di-isobutyl ketone and mixtures thereof.

4. A conducting non-aqueous electrodeposition composition, having a pH of between about 7–11, comprising a colloidal dispersion of polymers containing sulfone groups in their polymer chain within a solvent mixture, said composition being the product of 1 part by weight of a sulfone containing polymer consisting of aromatic groups selected from the group consisting of phenylene and diphenylene and mixtures thereof joined together by linkages selected from the group consisting of sulfone, ether and isopropylidene and mixtures thereof, said polymer characterized as having at least sulfone linkages, and about 0.8–1.2 parts by weight of a secondary or tertiary amine, and said solvent mixture comprising about 20–37 parts by weight of a non-aqueous, organic, aprotic solvent for the sulfone containing polymer and about 25–150 parts by weight of a non-aqueous, organic, ketone non-solvent for the sulfone containing polymer.

5. The composition of claim 4 wherein the amine is selected from the group consisting of trimethylamine, triethylamine, N,N-dimethylbenzylamine, tri-n-propylamine, tri-n-butylamine, N-ethylpiperidine, N-allylpiperidine, N-ethylmorpholine, N-N-diethyl-m-allylpiperidine, N-diethyl-p-toluidine, N-allylmorpholine, N,N-diethylaniline, pyridine, imidazole, 1-methylimidazole, 4-methylimidazole, 5-methylimidazole, 1-propylimidazole, 1,2-dimethylimidazole, 1-ethyl-2-methylimidazole, 1-phenylimidazole and mixtures thereof and the non-solvent for the polymer is selected from the group of ketones consisting of acetone, methyl isobutyl ketone, methyl ethyl ketone, methyl n-propyl ketone, diethyl ketone, mesityl oxide, cyclohexanone, methyl-n-butyl ketone, ethyl-n-butyl ketone, methyl-n-amyl ketone, acetophenone, methyl-n-hexyl ketone, isophorone, di-isobutyl ketone and mixtures thereof.

6. The composition of claim 5 wherein the sulfone containing polymers are selected from the group of polysulfones having the structure:

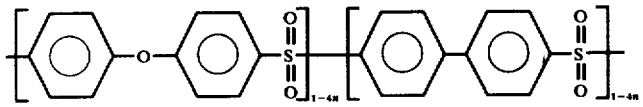

where $n = 20 - 30$,

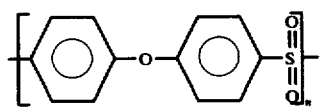

where $n = 20 - 500$,

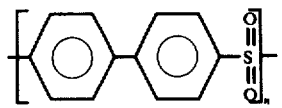

where $n = 20 - 500$,

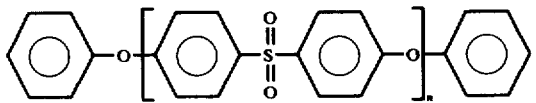

where $n = 2 - 4$, and

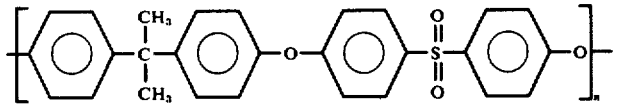

where $n = 5 - 80$, and mixtures thereof.

7. The composition of claim 6 wherein the solvent for the polysulfone containing polymer is selected from the group consisting of: N,N-dialkylcarboxylamides, N-methyl-2-pyrrolidone, dimethyl sulfoxide and pyridine and mixtures thereof.

8. The composition of claim 6 also containing filler particles.

9. An electrical conductor electrocoated with the cured composition of claim 6.

* * * * *